United States Patent

Prouty et al.

[11] Patent Number: 5,982,384
[45] Date of Patent: *Nov. 9, 1999

[54] SYSTEM AND METHOD FOR TRIANGLE RASTERIZATION WITH FRAME BUFFERS INTERLEAVED IN TWO DIMENSIONS

[75] Inventors: Bryan G. Prouty, Wellington; Ronald D. Larson, Ft. Collins, both of Colo.; Charles R. Dowdell, Nashua, N.H.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/715,167

[22] Filed: Sep. 17, 1996

Related U.S. Application Data

[63] Continuation of application No. 08/488,642, Jun. 8, 1995, abandoned.

[51] Int. Cl.[6] .................................................. G06F 15/00
[52] U.S. Cl. ............................................................. 345/441
[58] Field of Search ................................... 395/141, 143; 345/433, 418, 421, 440, 441, 443, 114, 118

[56] References Cited

U.S. PATENT DOCUMENTS

| | | | |
|---|---|---|---|
| 5,222,204 | 6/1993 | Swanson | 395/127 |
| 5,293,480 | 3/1994 | Miller et al. | 395/163 |
| 5,307,449 | 4/1994 | Kelley et al. | 395/119 |
| 5,353,394 | 10/1994 | Kubota | 395/141 |
| 5,404,448 | 4/1995 | Bowen et al. | 395/164 |
| 5,446,836 | 8/1995 | Lentz et al. | 395/141 |
| 5,528,738 | 6/1996 | Sfarti et al. | 395/143 |
| 5,555,360 | 9/1996 | Kumazaki et al. | 395/143 |

FOREIGN PATENT DOCUMENTS

| | | |
|---|---|---|
| 631252A2 | 4/1994 | European Pat. Off. . |
| 0464907 A2 | 1/1992 | United Kingdom . |
| 2245806A | 1/1992 | United Kingdom . |
| 2251770 | 7/1992 | United Kingdom . |
| 2251770A | 7/1992 | United Kingdom . |
| 2251773 | 7/1992 | United Kingdom . |
| 2297018 | 1/1995 | United Kingdom . |
| 2297018 | 7/1996 | United Kingdom . |

OTHER PUBLICATIONS

Foley, James D. et al., Computer Graphics:Principles and Practice 882–893 (2d ed. 1990).

*Primary Examiner*—Phu K. Nguyen

[57] ABSTRACT

A method and apparatus is provided for interleaving frame buffer controllers in two dimensions. Each frame buffer controller includes an edge stepper, a subspan stepper and a span stepper. The subspan stepper separates each span line into a plurality of parts. Each frame buffer controller provides pixel data for certain parts of the span line. The parts are defined by a start value, a stop value and a starting color value.

25 Claims, 13 Drawing Sheets

SYSTEM AND METHOD FOR TRIANGLE RASTERIZATION WITH FRAME BUFFERS INTERLEAVED IN TWO DIMENSIONS

This application is a continuation of application Ser. No. 08/488,642, filed Jun. 8, 1995, now abandoned.

FIELD OF THE INVENTION

The present invention relates generally to a rasterization system and method in a computer graphics system and, more particularly, to frame buffers for rasterization interleaved in two dimensions.

BACKGROUND OF THE INVENTION

Computer graphics systems commonly are used for displaying graphical representations of objects on a two dimensional display screen. Current computer graphics systems can provide highly detailed representations and are used in a variety of applications.

In typical computer graphics systems, an object to be represented on the display screen is broken down into a plurality of graphics primitives. Primitives are basic components of a graphics picture and may include points, lines, vectors and polygons, such as triangles. Typically, a hardware/software scheme is implemented to render, or draw, on the two-dimensional display screen, the graphics primitives that represent the view of one or more objects being represented on the screen.

Typically, the primitives that define the three-dimensional object to be rendered are provided from a host computer, which defines each primitive in terms of primitive data. For example, when the primitive is a triangle, the host computer may define the primitive in terms of the x,y,z coordinates of its vertices, as well as the R,G,B color values of each vertex. Rasterizing hardware interpolates the primitive data to compute the display screen pixels that are turned on to represent each primitive, and the R,G,B values for each pixel.

FIG. 1 illustrates the components of typical rasterizing hardware. A frame buffer controller 1 includes an edge stepper 3, a span stepper 5, and a memory controller 7. The edge stepper 3 determines through interpolation from the primitive data the pixels along each edge of a primitive and the corresponding color values. The pixels determined by edge stepper 3 define points on the ends of lines of pixels in the primitive. A line of pixels is called a span. The span stepper 5 receives the pixel data from the edge stepper for each line of pixels and determines the color values for each pixel in the line of pixels. The pixel and color values are provided to the memory controller 7 which writes the information in a video-random access memory (VRAM) 9. A display controller (not shown) drives the display based upon the contents of the VRAM.

Since the calculation process in the edge stepper 3 and span stepper 5 is complicated, the process can be slow. Using more than one frame buffer controller in parallel can increase the processing speed. FIG. 2 illustrates two parallel frame buffer controllers 1, 2. Each frame buffer controller 1, 2 includes an edge stepper 3, 4, a span stepper 5, 6, and a memory controller 7, 8. The memory controllers 7, 8 are connected to separate VRAMs 9, 10. The display controller combines the pixels stored in both VRAMs 9, 10 to generate the final display. When operating in parallel, each frame buffer controller may determine the values for specified lines of the screen (spans of pixels). The edge stepper 3, 4 on each frame buffer controller 1, 2 skips the non-specified lines of pixels. Although FIG. 2 illustrates two frame buffer controllers, any number is possible. Although the use of multiple frame buffer controllers in parallel can increase processing speed, the assignment of span lines to each frame buffer controller can be inefficient. Depending upon the shape and orientation of a primitive, the processing time for the span lines in frame buffer controllers can vary widely. For example, for a short, wide triangle primitive, one frame buffer controller may have scan lines covering a larger portion of the primitive at the base, and another frame buffer controller may have scan lines covering only a small portion at the tip. Since the primitives are provided simultaneously to each frame buffer controller, the processing time for the whole system depends upon the longest processing time in any frame buffer controller.

Alternatively, frame buffer controllers may be assigned to process different primitives. However, since primitives may be processed in any order, large FIFO memories are needed to reorder the pixel data to the correct positions and adjust for overlapping primitives.

SUMMARY OF THE INVENTION

In light of the varying processing times, it is an object of the present invention to provide multiple frame buffer controller which are interleaved in two dimensions for improved processing times. In one aspect of the present invention, each of the multiple frame buffer controllers is assigned a portion of each span line in the display. The portion of the span line assigned to a frame buffer may vary depending upon the span line in order to further improve the efficiency of parallel processing. In another aspect of the invention, the display may be divided into tiles or blocks. Each tile or block is further subdivided so that each frame buffer processes the primitive data to provide pixels on a portion of each span line within each tile.

In another aspect of the invention, each frame buffer controller includes two memory controllers. According to this aspect of the invention, the frame buffer controller provides alternately pixels or groups of pixels to each memory controller. Furthermore, each memory controller is connected to a separate VRAM.

In another aspect of the present invention, the frame buffer includes a subspan stepper between the edge stepper and span stepper. The subspan stepper determines start and stop values for each of the portions of the span assigned to that frame buffer. The subspan stepper also determines the starting color values for each portion of the span.

BRIEF DESCRIPTION OF THE DRAWINGS

For a better understanding of the present invention, reference is made to the accompanying drawings in which.

DETAILED DESCRIPTION

I. System Overview

Figure 3:
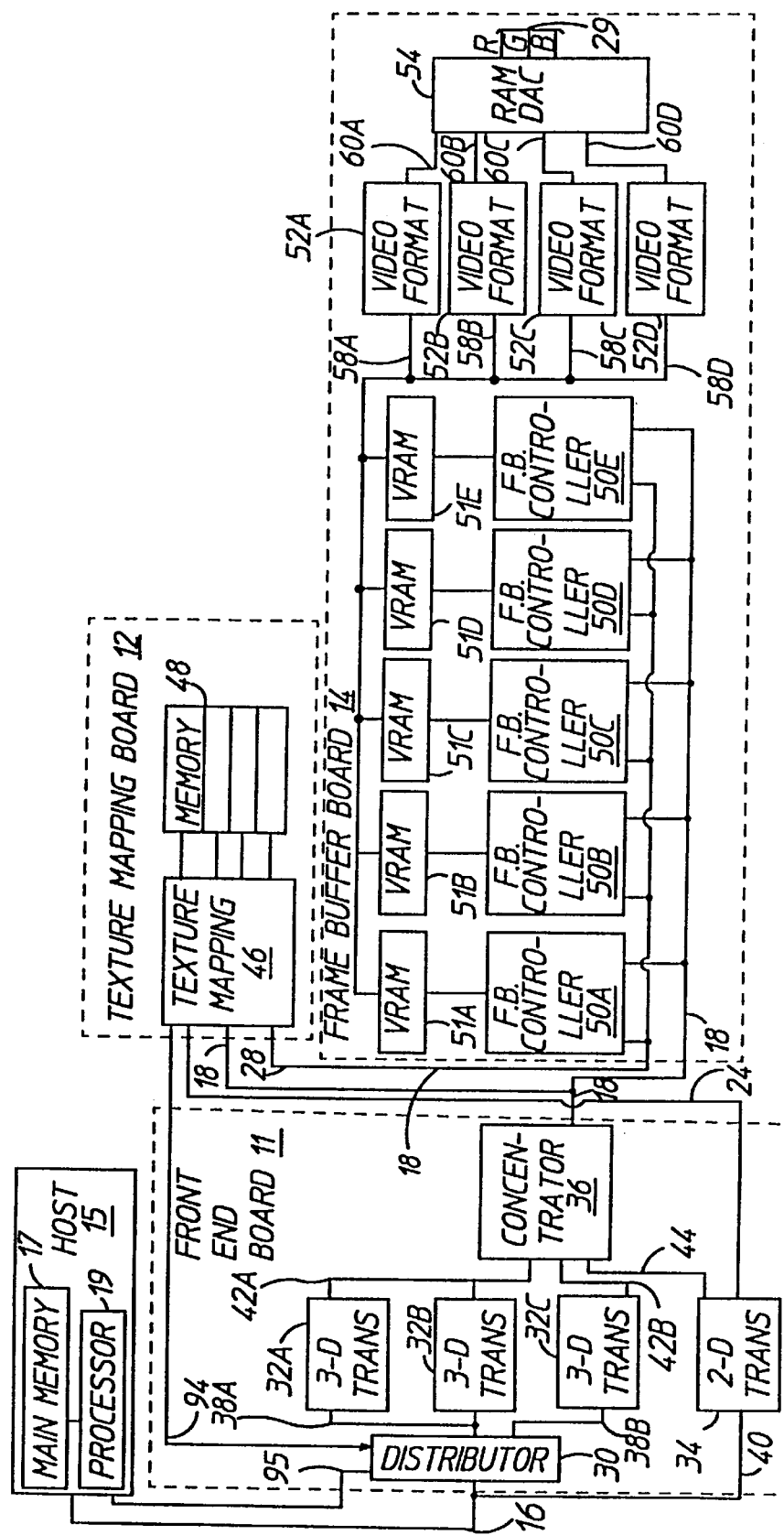
FIG. 3 is a block diagram of one embodiment of the overall computer graphics system of the present invention.

FIG. 3 is a block diagram of one embodiment of a graphics system of the present invention that includes parallel frame buffer controllers. It should be understood that the illustrative implementation shown is merely exemplary with respect to the number of boards and chips, the manner in which they are partitioned, the bus widths, and the data transfer rates. Numerous other implementations can be employed. As shown, the system includes a front end board 11, a texture mapping board 12, and a frame buffer board 14. The front end board communicates with a host computer 15 over a 52-bit bus 16. The front end board receives primitives to be rendered from the host computer over bus 16. The primitives are specified by x,y,z vertex coordinate data, R,G,B color data and texture S,T coordinates, all for portions of the primitives, such as for the vertices when the primitive is a triangle.

Data representing the primitives in three dimensions then is provided by the front end board 11 to the texture mapping board 12 and the frame buffer board 14 over 85-bit bus 18. The texture mapping board interpolates the primitive data received to compute the screen display pixels that will represent the primitive, and determines corresponding resultant texture data for each primitive pixel. The resultant texture data is provided to the frame buffer board over five 11-bit buses 28, which are shown in FIG. 3 as a single bus to clarify the figure. Although texture mapping is illustrated in the embodiment of FIG. 3, it is not required by the present invention.

The frame buffer board 14 also interpolates the primitive data received from the front end board 11 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 11, texture mapping board 12 and frame buffer board 14 are each pipelined and operate on multiple primitives simultaneously. While the texture mapping and frame buffer boards operate on primitives previously provided by the front end board, the front end board continues to operate upon and provide new primitives until the pipelines in the boards 12 and 14 become full.

The front end board 11 includes a distributor chip 30, three three-dimensional (3-D) geometry accelerator chips 32A, 32B and 32C, a two-dimensional (2-D) geometry accelerator chip 34 and a concentrator chip 36. The distributor chip 30 receives the x,y,z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C. Both buses 38A and 38B transfer data at a rate of 60 MHZ and provide sufficient bandwidth to support two 3-D geometry accelerator chips. 2-D primitive data is provided over a 44-bit bus 40 to the 2-D geometry accelerator chip 34 at a rate of 40 MHZ.

Each 3-D geometry accelerator chip transforms the x,y,z coordinates that define the primitives received into corresponding screen space coordinates, determines object R,G,B values and texture S,T values for the screen space coordinates, decomposes primitive quadrilaterals into triangles, and computes a triangle plane equation to define each triangle. Each 3-D geometry accelerator chip also performs view clipping operations to ensure an accurate screen display of the resulting image when multiple windows within the screen are displayed, or when a portion of a primitive extends beyond the view volume represented on the display screen. Output data from the 3-D geometry accelerator chips 32A, 32B and 32C respectively is provided over 44-bit buses 42A, 42B and 42C to concentrator chip 36 at a rate of 60 MHZ. Two-dimensional geometry accelerator chip 34 also provides output data to concentrator chip 36 over a 46-bit bus 44 at a rate of 45 MHZ. Concentrator chip 36 combines the 3-D primitive output data received from the 3-D geometry accelerator chips 32A–C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment of the invention, the local memory is formed from a plurality of SDRAM (synchronous dynamic random access memory) chips. The local memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A–C include points, lines and triangles. The texture mapping board does not perform texture mapping of points or lines, and operates only upon triangle primitives. The data representing the triangle primitives includes the x,y,z object pixel coordinates for at least one vertex, the object color R,G,B values of the at least one vertex, the coordinates in S,T of the portions of the texture map that correspond to the at least one vertex, and the plane equation of the triangle. The texture mapping chip 46 ignores the object pixel z coordinate and the object color R,G,B values. The chip 46 interpolates the x,y pixel coordinates and interpolates S and T coordinates that correspond to each x,y screen display pixel that represents the primitive. For each pixel, the texture mapping chip accesses the portion of the texture MIP map that corresponds thereto from the cache memory, and computes resultant texture data for the pixel, which may include a weighted average of multiple texels.

The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A–E are respectively coupled to groups of associated VRAM (video random access memory) chips 51A–E. The frame buffer board further includes four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen.

The manner in which the object and texture color values are combined can be controlled in a number of different ways. For example, in a replace mode, the object color values can be simply replaced by the texture color values, so that the texture color values are used in rendering the pixel. Alternatively, in a modulate mode, the object and texture color values can be multiplied together to generate the final R,G,B values for the pixel. Furthermore, a color control word can be stored for each texel that specifies a ratio defining the manner in which the corresponding texture color values are to be combined with the object color values. A resultant color control word can be determined for the resultant texel data corresponding to each pixel and provided to the frame buffer controller chips over bus 28 so that the controller chips can use the ratio specified by the corresponding resultant control word to determine the final R,G,B values for each pixel.

The resulting image video data generated by the frame buffer controller chips 50A–E, including R,G,B values for each pixel, is stored in the corresponding VRAM chips 51A–E. Each group of VRAM chips 51A–E includes eight VRAM chips, such that forty VRAM chips are located on the frame buffer board. Each of video format chips 52A–D is connected to, and receives data from, a different set of ten VRAM chips. The video data is serially shifted out of the VRAM chips and is respectively provided over 64-bit buses 58A, 58B, 58C, and 58D to the four video format chips 52A, 52B, 52C and 52D at a rate of 27 MHZ. The video format chips format the video data so that it can be handled by the RAMDAC and provide the formatted data over 32-bit buses 60A, 60B, 60C and 60D to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

Figure 4:
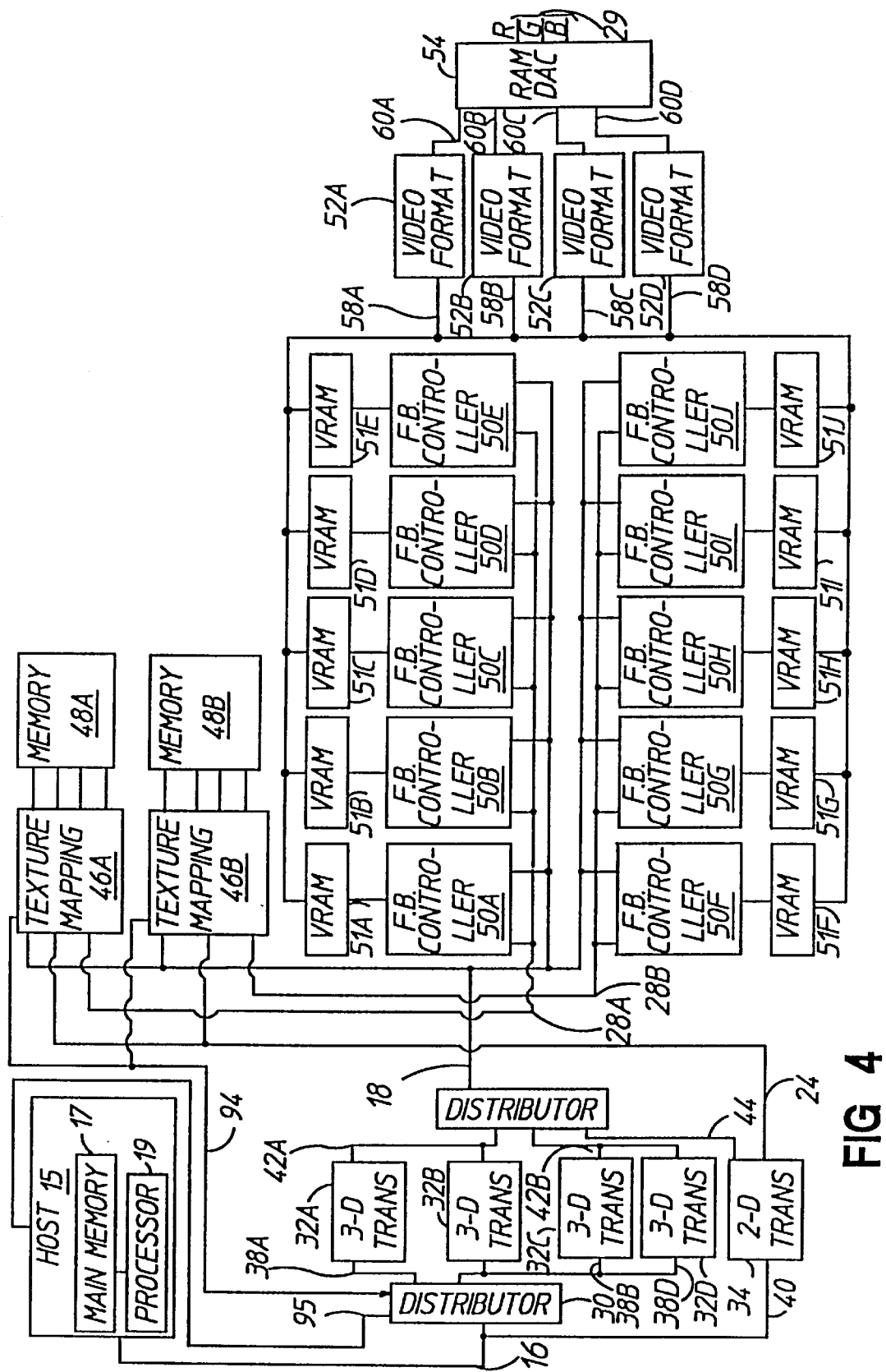
FIG. 4 is a block diagram of another embodiment of the overall computer graphics system of the present invention.

In one embodiment of the invention, hardware on the texture mapping board 12 and the frame buffer board 14 is replicated so that certain primitive rendering tasks can be performed on multiple primitives in parallel, thereby increasing the bandwidth of the system. An example of such an alternate embodiment of the present invention is shown in FIG. 4, which is a block diagram of a computer graphics system of the present invention having certain hardware replicated. The system of FIG. 4 includes four 3-D geometry accelerator chips 32A, 32B, 32C and 32D, two texture mapping chips 46A and 46B respectively associated with cache memories 48A and 48B, and ten frame buffer chips 50A–50J, each with an associated group of VRAM chips. The operation of the system of FIG. 4 is similar to that of the system of FIG. 3, described above. The replication of the hardware in the embodiment of FIG. 4 allows for increased system bandwidth because certain primitive rendering operations can be performed in parallel on multiple primitives.

II. Rasterization Overview

Figure 5:
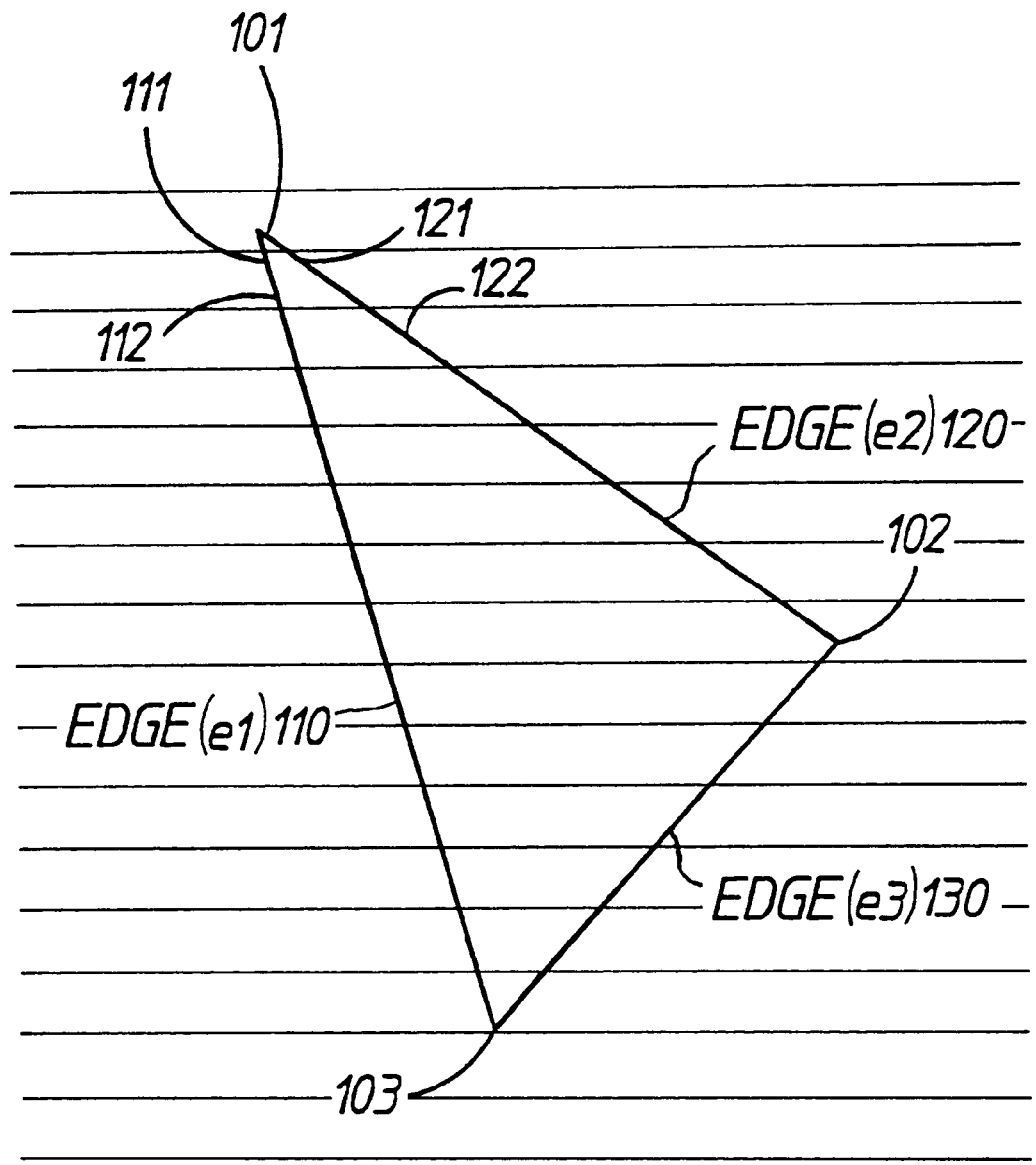
FIG. 5 is a graphical representation of rasterizing a primitive.

FIG. 5 illustrates the rasterization process for a primitive which is performed in the frame buffers. Primitives may include point lines and triangles. According to the overall system of the present invention, the basic primitives are triangles. The primitive information is provided by three vertices, 101, 102, 103. The information on each vertex includes x, y, z coordinate values, and R, G, B color values. The vertex information for the three vertices is used to determine a plane equation for the primitive. A color gradient and z gradient are determined from the plane equation and used in determining pixel data. In the rasterization process, the edges 110, 120, 130 ($e_1$, $e_2$, $e_3$,) of the triangle are determined and the edge having the longest y value 110 is also determined. In the rasterizing process, the pixels along each edge are then determined. Various methods can be used for determining the pixels along each edge. In one method, the pixels are determined by interpolating between the vertices 101, 103 along edge 110 for each row of pixels or span line to determine the pixels closest to the edge 110. According to another embodiment, pixels are selected so as always to be inside the primitive. This can be accomplished by interpolating x and y values to determine a mathematical position for each edge at each span line. Pixels are then selected to be greater than the edge value for left edges and less than the edge value for a right edge. Specific rules are needed to determine whether a pixel is to be considered inside a primitive if it lies directly on an edge. By using pixels inside edges, no pixels will be overwritten when adjacent primitives are processed.

One or more rows of pixels are referred to as a span line. The R, G, B color values for the edge pixels 111, 112 are also determined through interpolation of the values at the vertices 101, 103. Similarly, pixels 121, 122 are determined along the opposite edge 120 of the primitive along the same span lines. Then, along each span line, the color values for the pixels are determined based upon the color values for the points along each edge.

Figure 6:
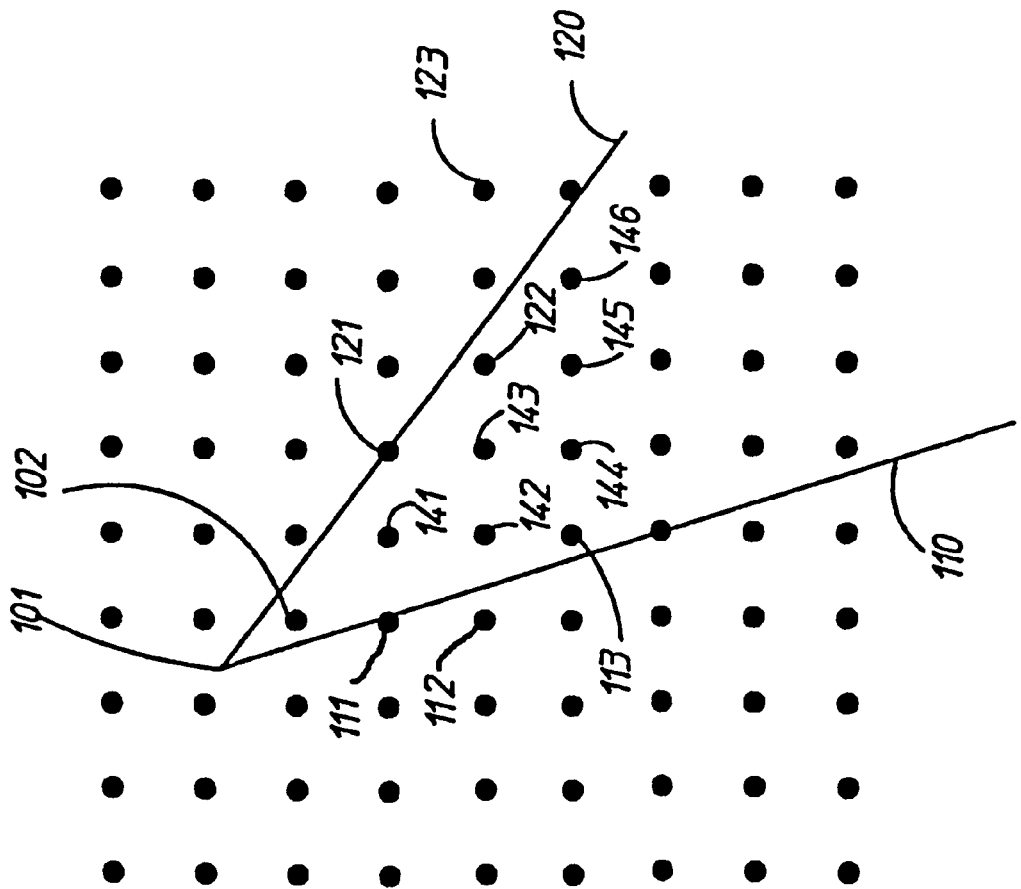
FIG. 6 is another graphical illustration of rasterizing a primitive.

FIG. 6 is a graphical illustration of the rasterization process in greater detail. As illustrated in FIG. 6, pixels of the screen display form a grid of points having corresponding color values. The edge lines 110, 120 of the primitive do not necessarily align with the grid. Therefore, the pixels inside the primitive on each span line of the grid are determined. For example, pixels 102, 111–113 correspond to the first four span lines for edge 110. Pixel 102 is the pixel closest to vertex 101 defining the primitive.

The pixels 141–143 on each span line between the edges are determined based upon the pixels 112, 113, 122, 123 on each span line closest to the edges.

III. Frame Buffer Controllers Interleaved in Two Dimensions

Figure 7:
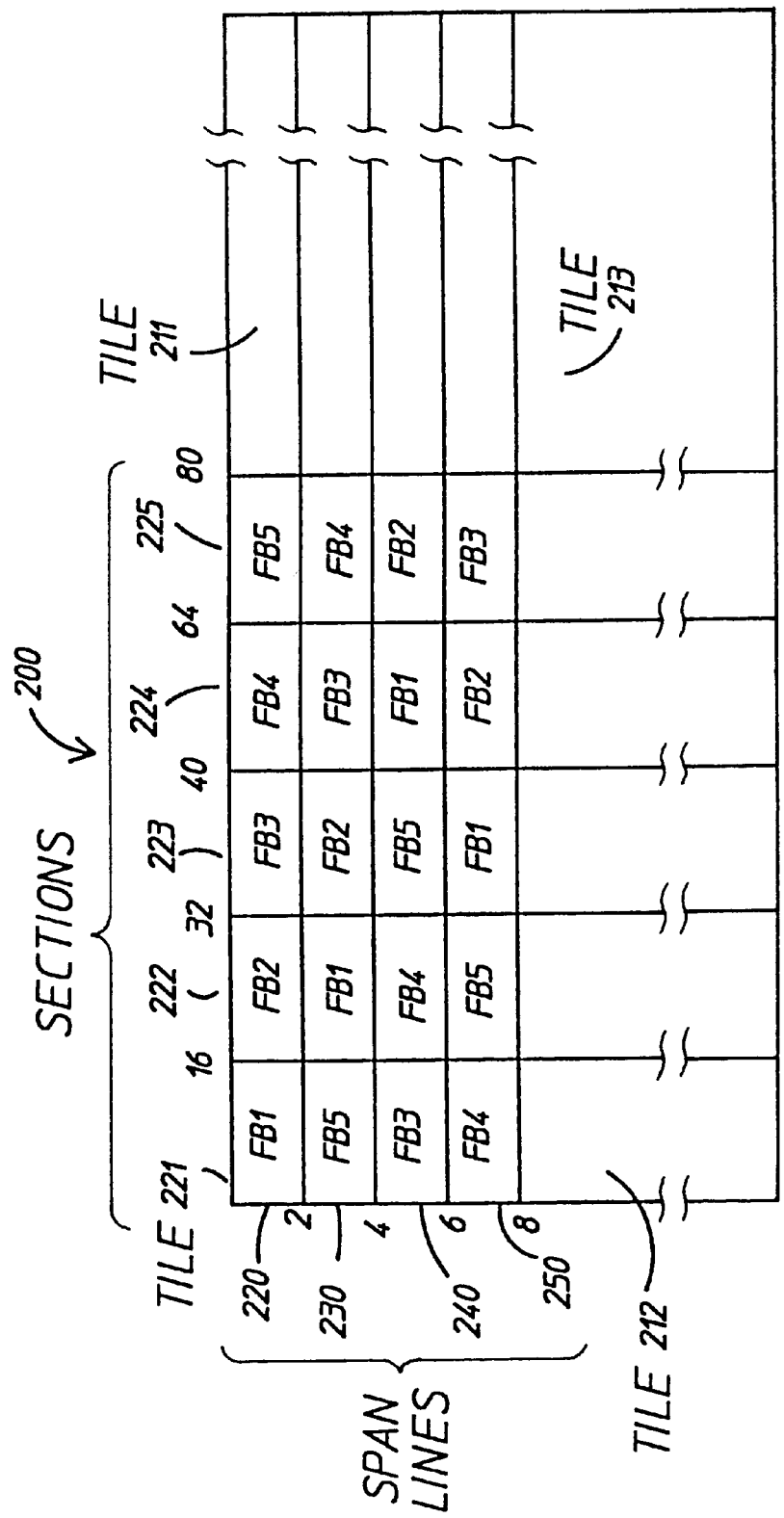
FIG. 7 is a diagram illustrating interleaved frame buffer controllers.

According to the present invention, the frame buffer controllers for rasterizing the primitives include multiple frame buffer controllers which are assigned portions of the pixel grid, interleaved in two dimensions. As illustrated in FIG. 7, the screen display 200 is separated into tiles 210–213. According to one embodiment of the invention, each tile is 8 pixels by 80 pixels. Each span line 220, 230, 240, 250 encompasses a portion of each tile across the width of the screen. The embodiment shown in FIG. 3 includes five frame buffer controllers. Therefore, each span line in the tile is divided into five sections, 221–225. Each frame buffer is assigned a portion of each span line in the tile for processing. Since primitives may have any position, orientation and size, it may cover any portion of one or more tiles. Therefore, in order to improve processing efficiency, the frame buffer controllers can be assigned blocks dispersed throughout each tile. The volume of processing data in the controller is equalized over several primitives. In fact, a single primitive will not likely utilize all frame buffer controllers. FIFO memories in the frame buffer controllers may be utilized to pipeline processing so that the overall processing across frame buffer controllers is approximately constant. The frame buffer controller assignments are applicable to each tile in the screen. FIG. 7 illustrates assignments for the five frame buffer controllers of the embodiment shown in FIG. 3.

Figure 8:
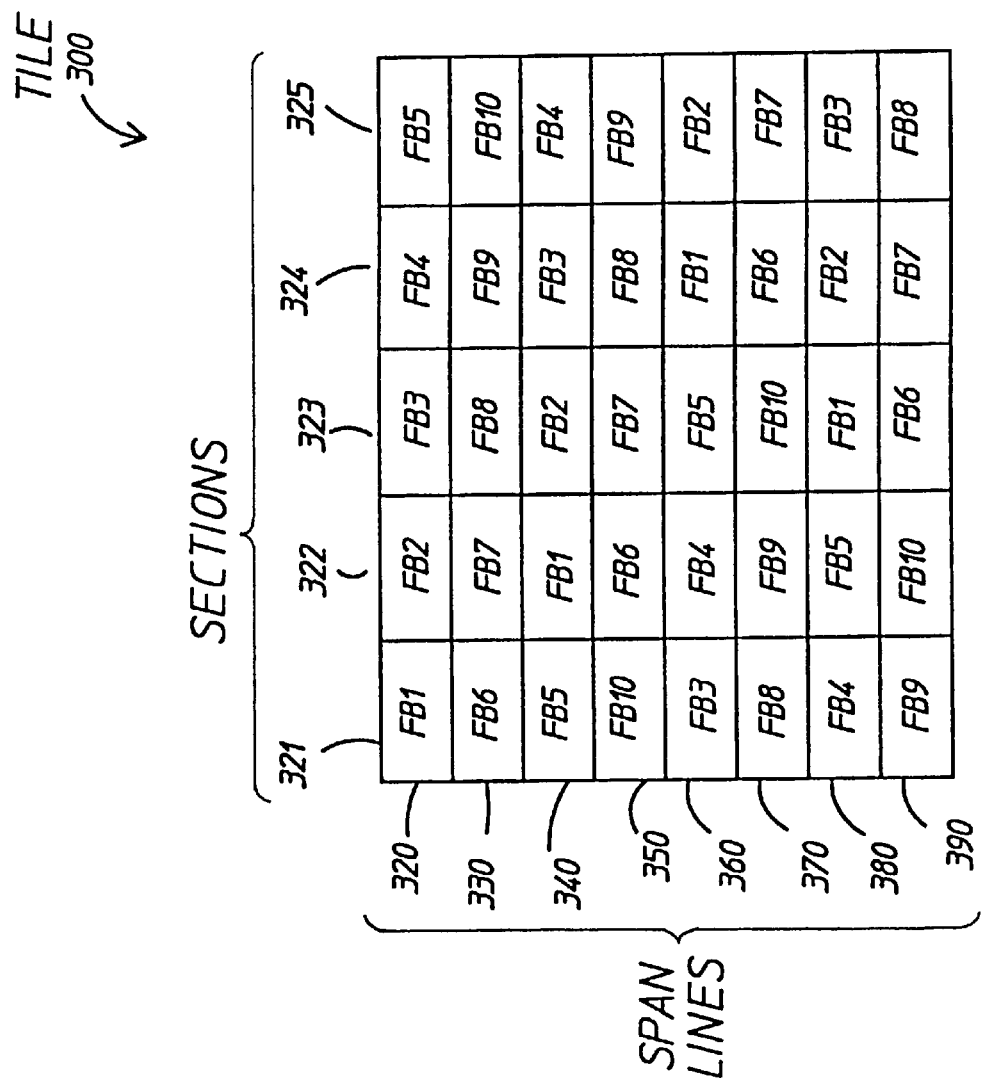
FIG. 8 is a another illustration of interleaved frame buffer controllers.

FIG. 8 discloses frame buffer controller tile assignments corresponding to the second embodiment of the system as shown in FIG. 4. In this embodiment 10 frame buffers are used for increased parallelism and speed. In this embodiment, each tile 300 is 16 pixels by 80 pixels, and covers portions of 8 scan lines each having 2 rows of pixels. Each tile is divided into 5 columns 321–325. Each frame buffer controller is assigned a block in every other span line of the tile so that the blocks processed by each frame buffer controller are dispersed throughout the tile. By assigning blocks in alternate rows, performance of each edge stepper is improved because it can skip lines where no assigned block is located. One pattern for assigning the frame buffer controllers is illustrated in FIG. 8.

Frame buffers are interleaved in two dimensions in order to increase the bandwidth for screen refresh. By interleaving memory controllers along a span line, the required bandwidth required per memory controller is (total bandwidth)/(number of memory controllers). Also, for large polygons, large fill areas and block transfers, the performance for writing pixels along the scan line is improved due to interleaving frame buffer controllers interleaved on span lines. Performance in processing small triangles and vectors mainly in the y direction is improved by interleaving frame buffer controllers in the y direction.

IV. Frame Buffer Configuration and Operation

Figure 9:
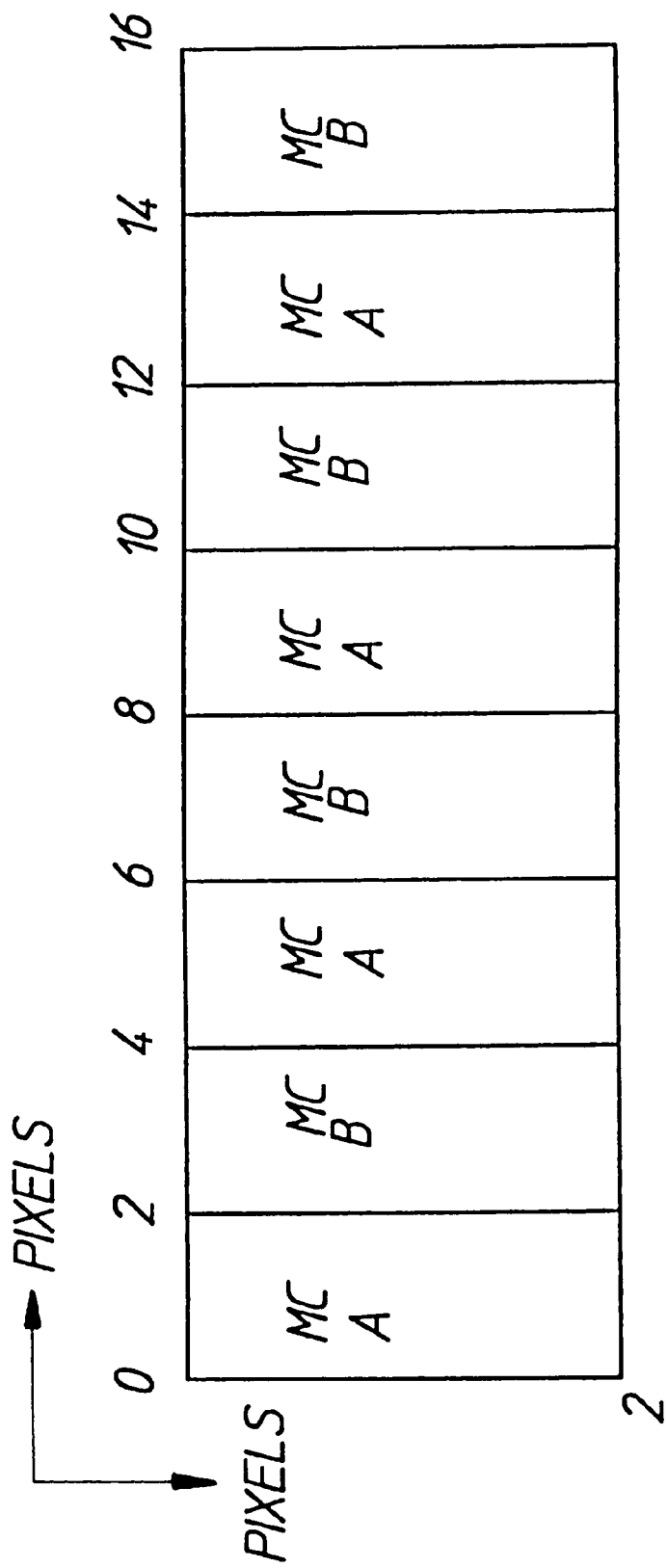
FIG. 9 is an illustration of interleaved memory controllers.
Figure 10:
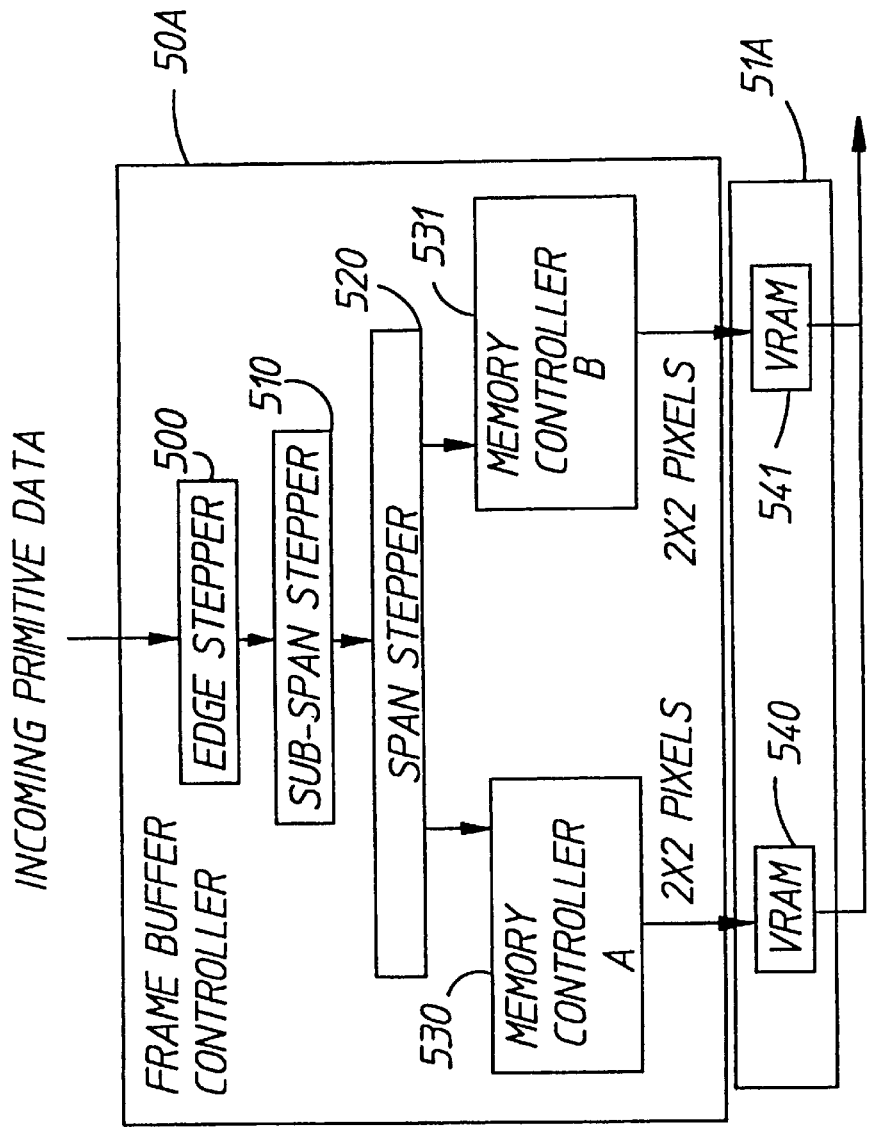
FIG. 10 is a block diagram of an embodiment of the frame buffer controller according to the present invention.

FIG. 10 is a block diagram of a frame buffer controller according to the present invention. The frame buffer controller is formed as a frame buffer controller chip 50A and includes an edge stepper 500, a subspan stepper 510, a span stepper 520, and two memory controllers 530, 531. Each of the memory controllers 530, 531 is connected in turn to a VRAM 540, 541. The two VRAMs 540, 541 connected to the frame buffer controller make up the VRAM 51A for the frame buffer controller chip as shown in FIG. 3. As discussed above, each VRAM may include several VRAM chips. Two memory controllers 530, 531 are used to increase processing speed. In order to speed processing, the data provided to the memory controllers are interleaved by the frame buffer controller. The frame buffer controller alternately provides two adjacent pixels of data to each of the memory controllers, on a first and then second pixel line of a span line. As illustrated in FIG. 9, each block of data from the frame buffer controller is 2 pixels by 16 pixels. Therefore, up to eight 2×2 subblocks of pixels are alternately sent one line and pixel at a time to the memory controllers for each block of data. The assignment of pixels to a memory controller in 2×2 subblocks is advantageous for z data accesses. The memory controllers each include a cache for z data. Z data generally is organized in 2×2 blocks. A block of z data is read into the cache for later use with subsequent pixels assigned to the memory controller. Of course, other procedures for assigning pixels to each of the memory controllers can be used.

Figure 1:
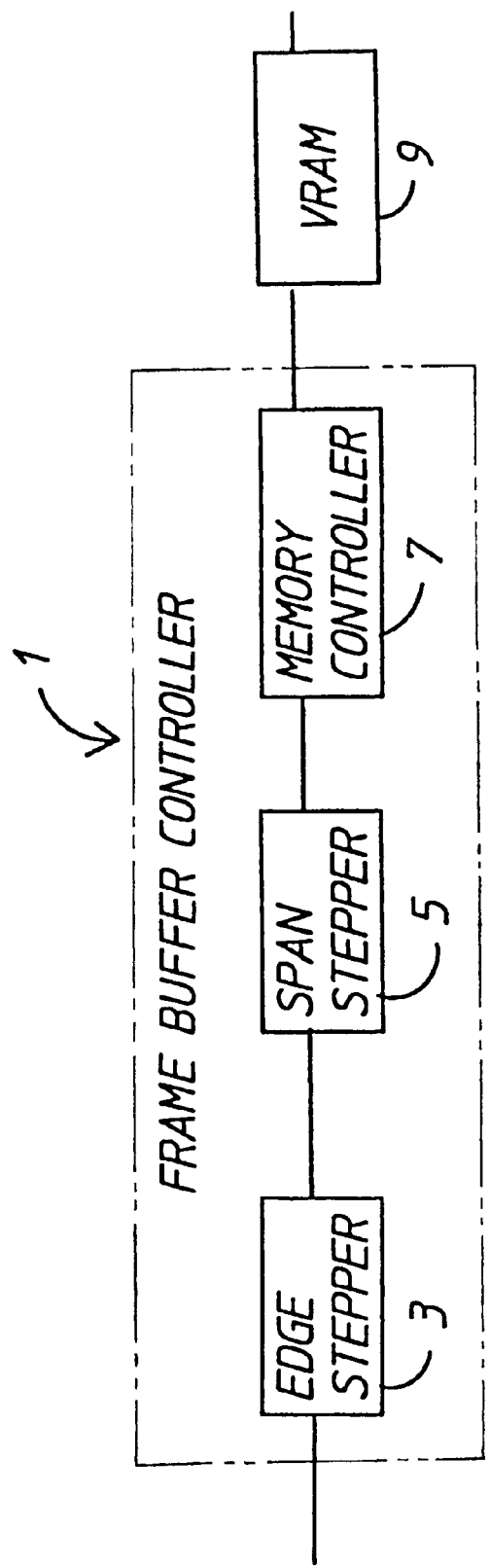
FIG. 1 is a block diagram of a conventional frame buffer controller.
Figure 2:
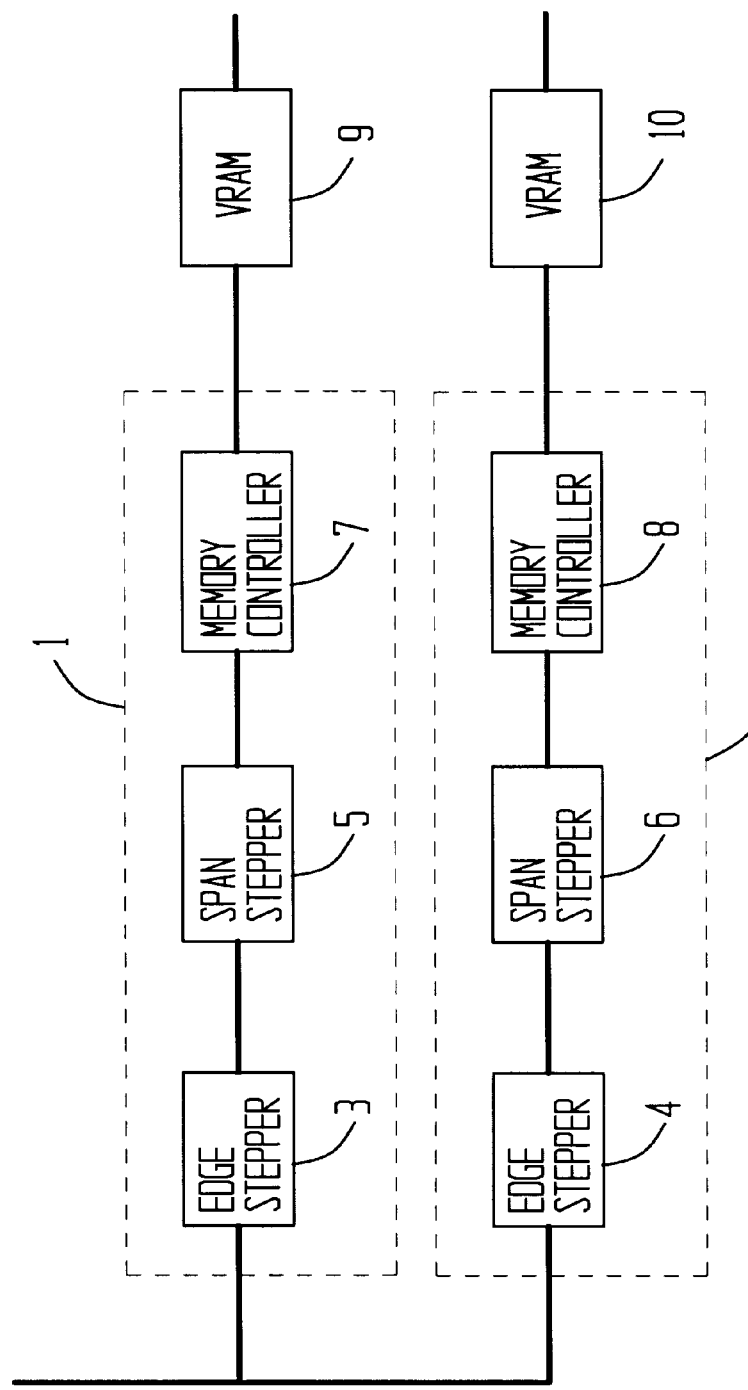
FIG. 2 is a block diagram of conventional parallel frame buffer controller.

The edge stepper 500, subspan stepper 510, and span stepper 520 convert the incoming primitive data into the output pixel data. As discussed above, the primitive data includes values for three vertices of a triangle and R, G, B color values for the same three vertices. The edge stepper 500 operates in a manner similar to an edge stepper of a conventional frame buffer as illustrated in FIG. 1. Through interpolation, it determines the pixels on each pixel line which define the edges of the primitive. For the five frame buffer controller system illustrated in FIG. 3, each frame buffer controller processes data for each span line, and each corresponding edge stepper operates in a manner similar to an edge stepper in a non-parallel processing frame buffer controller (FIG. 1). When ten frame buffer controllers are used, as in the embodiment of FIG. 4, each frame buffer controller processes data on alternating span lines, as illustrated in FIG. 8. In this case, the edge steppers 500 of the frame buffer controllers operates similar to edge steppers in conventional parallel processing frame buffer controllers, as illustrated in FIG. 2. Each edge stepper 500 provides pixel data for points along the edge in alternating span lines of 2 pixels.

Figure 13:
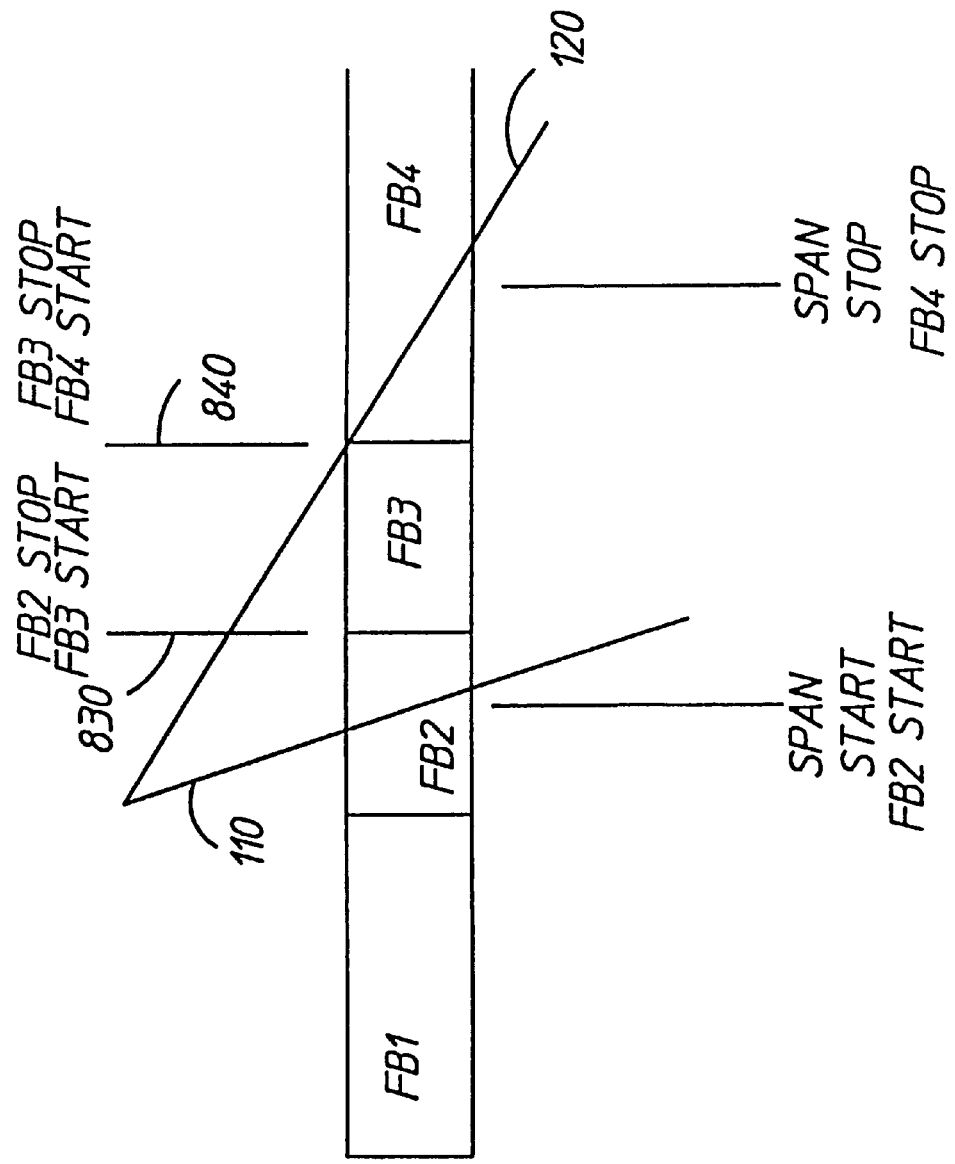
FIG. 13 is an illustration of subspan start, stop and jump values.

The edge stepper 500 provides the edge pixel data to the subspan stepper 510. The edge pixel information may include the y value of the span line, the x values of each edge, the R, G, B color values of the first edge, and a color gradient for the span. The subspan stepper 500 identifies start, stop and jump values for a block assigned to that frame buffer controller in each tile along the span line. The start and stop values indicate the pixel values within the primitive in the corresponding blocks assigned to that frame buffer controller. FIG. 13 illustrates the relationship between the start and stop values for subspans. If a block of the span line assigned to the frame buffer controller is entirely within the primitive (FB 3), the start and stop values would be the boundaries of that block. If an edge of the primitive passes through a block of the span line assigned to the frame buffer controller (FB 2, FB 4), then the start or stop value may also relate to the position of the edge in that block. The jump value represents the distance between the start of a block and the starting edge and can be used to determine the color corresponding to the pixel at the start position of the block.

The start, stop and jump values are provided to a span stepper 520, which generates the pixel data. A FIFO memory (not shown) may be included between the subspan stepper and the span stepper. The FIFO memory results in pipelined processing of primitives which evens out processing times for the frame buffer controllers. Based upon the start, stop and jump values, the span stepper 520 determines all of the pixels in all of the blocks of the span line assigned to that frame buffer controller. The span stepper 520 outputs the pixel data, one pixel at a time, to the memory controllers 530, 531.

Figure 11:
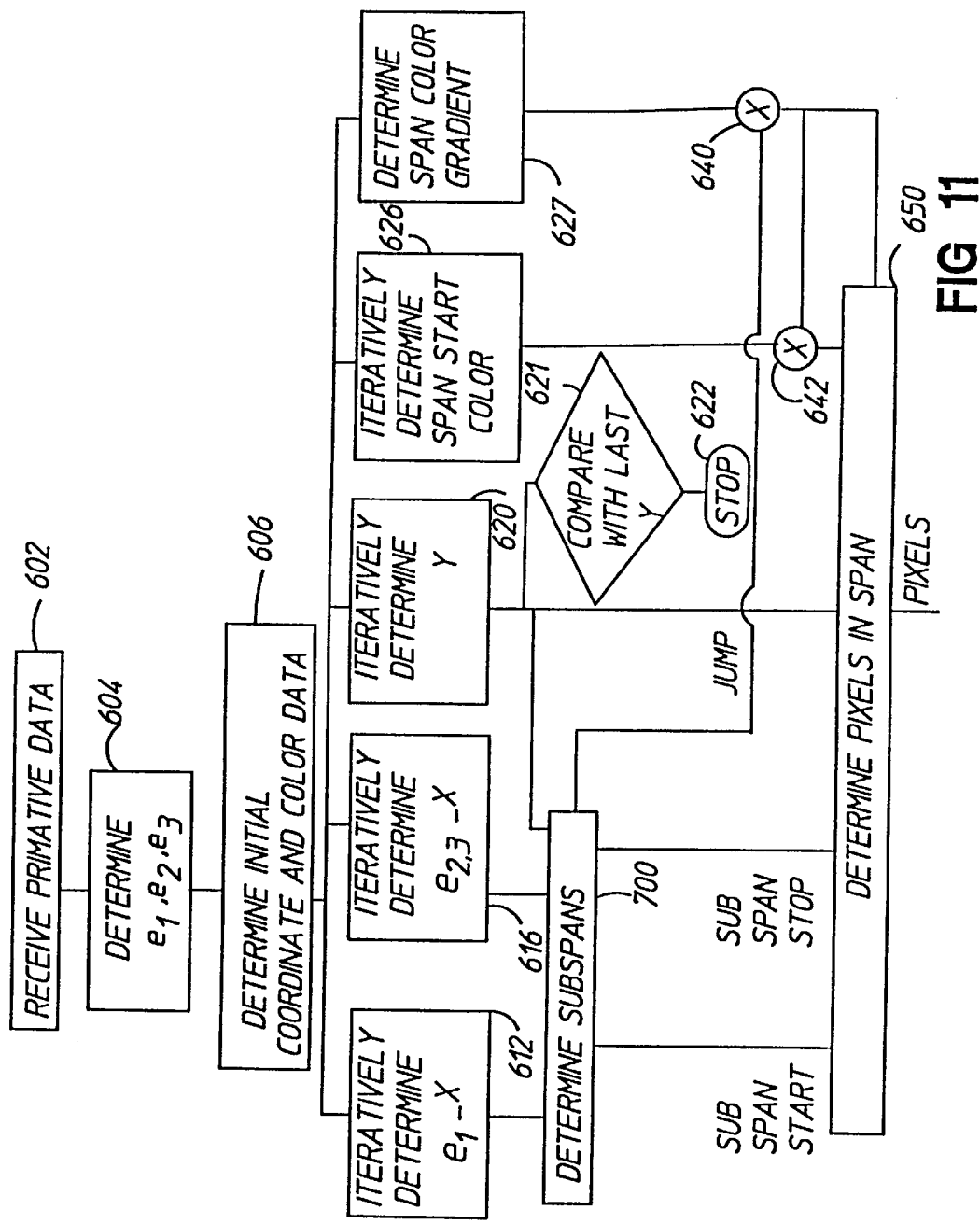
FIG. 11 is a block flow diagram of operation of the frame buffer controller of the present invention.

The operation of the frame buffer controller is illustrated in the block flow diagram of FIG. 11. At step 602, the primitive data is received. Based upon the primitive data, the edges $e_1$, $e_2$, $e_3$ are determined at step 604. The edges are determined so that the first edge el is the edge in the primitive which spans the largest y range. At step 606, coordinate and color data are determined for stepping along an edge. This coordinate and color data may include a y value of the top vertex of edge $e_1$ (101 in FIG. 5), the y value of the lowest vertex on edge $e_1$ (103 in FIG. 5), the x value of the top most vertex, the slope in x of $e_1$ the x value and slope for $e_2$, or $e_3$, the R, G, B, color values of the top most vertex, the color gradient along $e_1$ and a span color gradient for each span line. In order to step along $e_1$, the edge stepper iteratively determines the x value of $e_1$ (step 612), the x value of $e_2$, or $e_3$, depending upon the span line (step 616), the y value of the span line (step 602), and the span start color (step 626). The y value defines the span line, the x values define the start and stop values of the primitive in that span line, and the color value defines the starting color for that span line. Also, a span color gradient 627 is determined. The span color gradient is used to determine the color at the start of each block and the color for each pixel in a block. At each iteration, the y value is compared with the last y value (step 621) to determined whether to stop edge stepping (step 622).

The sub span stepper receives the x values for $e_1$, and $e_2$, $e_3$ and generates start, stop and jump values for each block of the span line assigned to that frame buffer controller (step 700). The jump value is multiplied by the span color gradient (step 640) and added to the starting color 633 (at step 642) to provide the starting color value for each block of the span line. The start, stop and starting color value are provided to a span stepper which then generates the pixel data between the start and stop values using the initial color and span color gradient to determine the values and colors.

Figure 12:
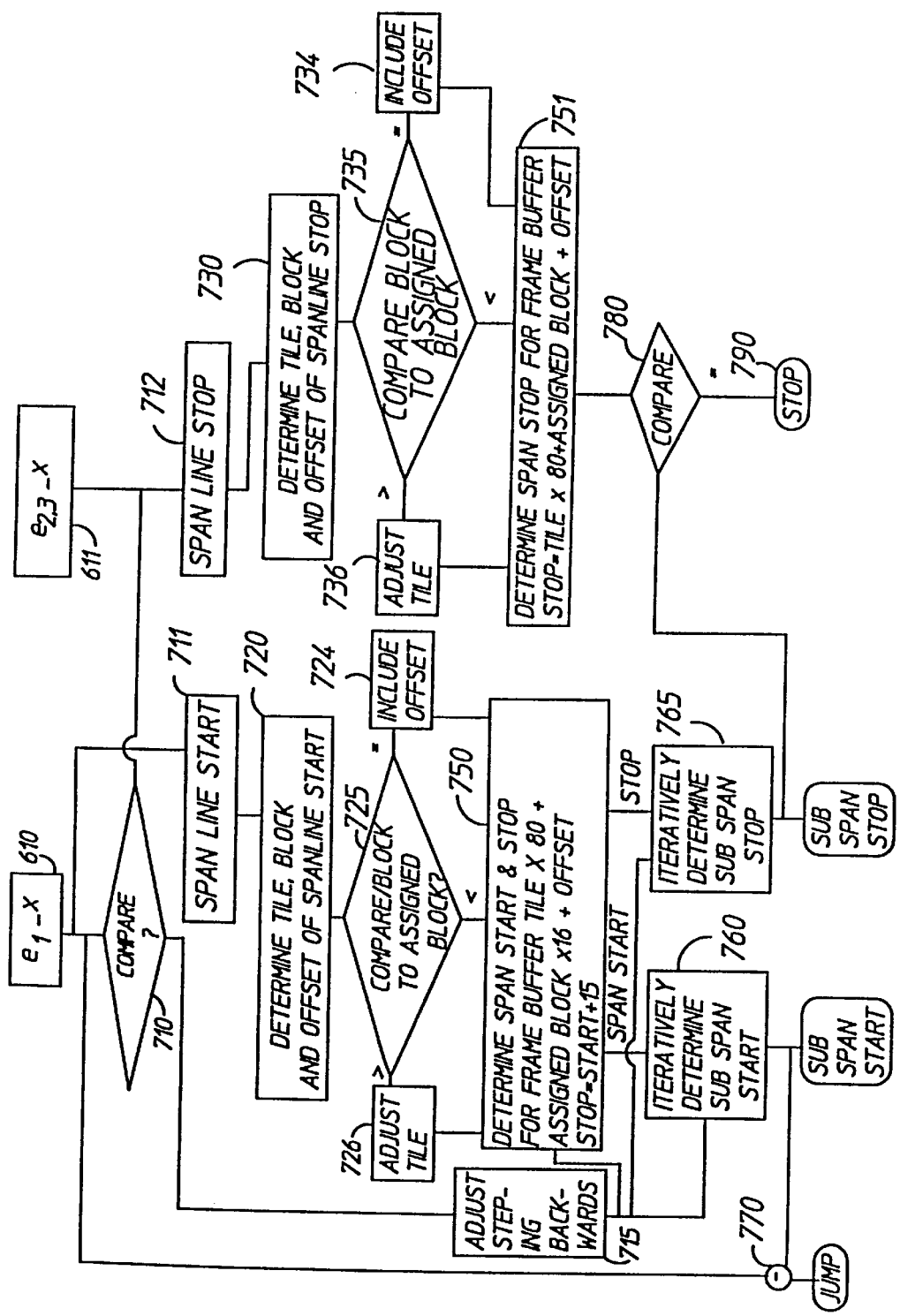
FIG. 12 is a block flow diagram of operation of the subspan stepper of the present invention.

Operation of the subspan generator is illustrated in the block flow diagram of FIG. 12. The x values for $e_1$, and $e_2$, $e_3$, are compared at step 710 to determine the direction of stepping in the span. The span stepper always steps from $e_1$ to $e_2$ or $e_3$. If the x value for $e_1$ is greater than the x value for $e_2$, $e_3$, then the subspan start and stop values and the stepping direction are adjusted backwards (step 715). The x value of $e_1$ becomes the span line start 711, and the x value of $e_2$, $e_3$ becomes the span line stop 712 for the primitive in that span line.

The span line start value is then modulated at step 720 to determine a tile number, a block and an offset for the span line start. The tile is the tile in the row of the span line in which the span line start value is located. The block is the column 221–225 in the tile in which the span line start value is located. The offset value is the pixel position within the 16 pixels of the block where the span line start value is located. In practice, the start value is a digital, binary value. Thus, the lowest 4 bits of the start value can be taken as the offset. The remaining bits are shift left by 4 bits, which divides the start value by 16 (the width of a block). A MOD function is then applied to the shifted bits with an operand of 5 (the number of blocks in a tile). The MOD function provides a result and remainder. The result represents the tile number and the remainder represents the block number.

In order to determine the subspan start value for the first block assigned to the frame buffer controller, at step 725, the block is compared with the assigned block for the frame buffer controller in that scan line (as set according to the patterns in FIGS. 7 and 8). If the block of the starting value is less than the assigned block, then the assigned block is entirely within the primitive (FB1 in FIG. 13), and it is outputted to the next step. If the block is greater than the assigned block, then the assigned block is entirely outside of the primitive (FB1 in FIG. 13) and the tile number is augmented by one (step 726). If the block is equal to the assigned block, then the edge is within the assigned block (FB 2 in FIG. 13) and the offset value is passed to the next step (step 724). At step 750, the start of the first subspan is determined based upon the adjusted tile number, assigned block and offset. In the disclosed embodiment having tiles 80 pixels wide, frame buffer positions 16 pixels wide, the starting value would be equal to the equation:

$$\text{Tile} \times 80 + \text{block} \times 16 + \text{offset} \tag{1}$$

The stop value for the subspan is determined by adding 15 (the width of the block) to the start value. If $e_1$ is greater than $e_2$, $e_3$ (step 715), the stop value is determined by subtracting 15 from the start value.

The same process is used to determine the stop value for the last subspan (steps 730, 734, 735, 736, 751). The span stop value is modulated to determine the tile, block and offset for the stop. The block is then compared with the assigned block and the tile and offset values are appropriately adjusted.

Each subspan in the span line can be determined by iteratively adding 80 (the width of a tile) to the initial start (step 760) and stop values (step 765). For $e_1$ greater than $e_2$, $e_3$, 80 is subtracted from the initial start value to step backwards. Of course, if an offset value was initially used because an edge went through the assigned block, the offset value would be ignored in subsequent iterations for determining subspans. Rather than adding (or subtracting) 80 from the start value and subtracting an offset value if present, subsequent subspan start values can be determined by augmenting (or decramenting) the tile number, setting the offset value to 0, and recalculating the starting value according to equation (1).

The stop value for the subspan at each iteration is compared to the final stop value in order to determine the last subspan in the span line. The jump value is determined as the difference between the start value of the subspan and the initial x value (step 770) at the start of the span for the primitive.

As illustrated in FIGS. 2 and 3, the graphic system of the present invention sends texture mapping information to the frame buffers. Texel data, including R, G, B and alpha values for pixels are sent from the texture mapping board 12 to all of the frame buffer controllers 50A–50E. Since per pixel texel data is provided, the texel data does not need to pass through the edge stepper 500, subspan stepper 510 or span stepper 520 and may be combined with the pixel data and provided to the memory controllers. As discussed above, various methods can be used to combine the primitive pixel data and the texel data.

The circuitry shown and described herein is given by way of example only. The circuitry is preferably implemented in a large scale custom integrated circuit using logic synthesis software that is commercially available, for example, from Synopsys. The logic synthesis software optimizes and translates circuit descriptions written in high level languages, such as Veralog, into logic gates. The circuitry may be implemented using a CMOS process that produces 1 micron FET's which operate at 5 volts, a CMOS process that produces 0.6 micron drawn gate length devices which operate at 3.3 volts, or any other suitable process for implementing digital circuits. Since the input to the logic synthesis software is functional rather than structural, actual circuits generated by the logic synthesis software may differ from those disclosed herein.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed:

1. A frame buffer controller comprising:
   an edge stepper receiving primitive data and generating a series of span line data representing opposing edges of the primitive data for each span line of a plurality of span lines of the pixel grid;
   a subspan stepper receiving the series of span line data and generating, based upon the span line data for each span line of the series of span line data, a series of subspan data representing opposing edges of subspans within the opposing edges of the primitive data, each span line being separated into a plurality of subspans; and
   a span stepper receiving each series of subspan data and generating pixel data corresponding to the subspan data.

2. The frame buffer controller of claim 1, wherein, for portions of a span line, said subspan data comprises:
   a start value;
   a stop value; and
   a color start value.

3. The frame buffer controller of claim 2, wherein the portions of a span line defined by the subspan data vary based upon the span line.

4. The frame buffer controller of claim 3, wherein the portions of the span line are predetermined for each span line.

5. The frame buffer controller of claim 1, further comprising:
   at least one memory for storing pixel data; and
   at least one memory controller receiving the pixel data from the span stepper and storing pixel data in the at least one memory.

6. The frame buffer controller of claim 5,
   wherein the pixel grid is separated into blocks of pixels each including at least one subblock of one or more pixels,
   wherein the at least one memory controller comprises a plurality of memory controllers,
   wherein pixel data for each subblock of pixel data generated by the span stepper is distributed to a predetermined memory controller.

7. The frame buffer controller of claim 1, wherein the span line data comprises:
   a span line start value;
   a span line stop value;
   a span line color value; and
   a span line color gradient value.

8. The frame buffer controller of claim 1, wherein each span line comprises two rows of pixels of a pixel grid.

9. The frame buffer controller of claim 1, wherein one or more of the plurality of subspans of each span line is assigned to the frame buffer controller.

10. A frame buffer system for a computer graphics system, the frame buffer system comprising:
    a plurality of frame buffer controllers receiving primitive data from the computer graphics system, wherein each frame buffer controller includes:
      an edge stepper for stepping along span lines of an edge of the primitive and for,generating span line data representing first portions of each span lines which are within the primitive;
      a subspan stepper receiving the span line data corresponding to each span line and generating, for each span line, a series of subspan data representing second portions of a span line, the second portions being part of the first portion for each span line; and
      a span stepper receiving the series of subspan data and generating pixel data for the primitive in the portions of the span lines represented by the subspan data.

11. The frame buffer system of claim 10, wherein the edge stepper of each frame buffer controller generates span line data corresponding to each span line.

12. The frame buffer system of claim 10, wherein the edge stepper of each frame buffer controller generates span line data corresponding to predetermined span lines.

13. The frame buffer system of claim 12, wherein the predetermined span lines are alternate span lines.

14. The frame buffer system of claim 10, further comprising at least one memory for storing the pixel data.

15. The frame buffer system of claim 14, wherein each frame buffer controller includes at least one memory controller for writing pixel data in the at least one memory.

16. The frame buffer system of claim 15, wherein the at least one memory comprises:
    a plurality of memories corresponding to each of the plurality of frame buffer controllers,
    wherein the at least one memory controller includes a plurality of memory controllers for each frame buffer controller, and
    wherein alternating portions of the pixel data are provided to each of the plurality of memory controllers for each frame buffer controller for storage in a corresponding memory.

17. The frame buffer system of claim 14, wherein the at least one memory includes a plurality of memories corresponding to the plurality of frame buffer controllers.

18. The frame buffer controller of claim 10, wherein, for portions of a span line, said subspan data comprises:
    a start value;
    a stop value; and
    a color start value.

19. The frame buffer system of claim 18, wherein the portions of a span line defined by the subspan data vary based upon the span line.

20. The frame buffer system of claim 18, wherein the portions of the span line are predetermined for each span line.

21. The frame buffer system of claim 10, wherein an entire span line is divided into portions of the span line covered by one of the plurality of frame buffer controllers.

22. The frame buffer controller of claim 10, wherein each span line comprises two rows of pixels of a pixel grid.

23. The frame buffer controller of claim 10, wherein each subspans comprises at least a portion of one or more blocks of pixels assigned to the frame buffer controller, wherein said start value and said stop value indicate pixel values in the blocks of pixels assigned to the frame buffer controller.

24. A method of operating a frame buffer controller comprising the steps of:

converting primitive data into first portions of span lines represented as span start and span stop values for each span line within the primitive;

dividing the first portion of each span line between the span start and span stop values into second portions corresponding to subspan sections of each span line; and generating pixel data corresponding to selected ones of the subspan sections for the span lines.

25. The method of claim 24, further comprising the step of determining the plurality of subspan sections based upon the span line.

* * * * *